United States Patent
Garbus et al.

(10) Patent No.: US 10,778,023 B2
(45) Date of Patent: *Sep. 15, 2020

(54) COORDINATING COMPLEMENTARY NOTIFICATIONS ACROSS RELATED COMPUTING DEVICES CONNECTED TO A WIRELESS CHARGING APPARATUS

(71) Applicant: Apple Inc., Cupertino, CA (US)

(72) Inventors: Brandon R. Garbus, Santa Clara, CA (US); Christopher C. Jensen, Santa Cruz, CA (US); Alexei E. Kosut, Campbell, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/353,941

(22) Filed: Mar. 14, 2019

(65) Prior Publication Data
US 2019/0305572 A1    Oct. 3, 2019

Related U.S. Application Data

(63) Continuation of application No. 15/721,478, filed on Sep. 29, 2017, now Pat. No. 10,270,270.

(Continued)

(51) Int. Cl.
*H02J 7/00*     (2006.01)
*H02J 7/02*     (2016.01)
*H02J 50/10*     (2016.01)

(52) U.S. Cl.
CPC .......... *H02J 7/0047* (2013.01); *H02J 7/0027* (2013.01); *H02J 7/00034* (2020.01); *H02J 7/025* (2013.01); *H02J 50/10* (2016.02)

(58) Field of Classification Search
CPC ........ H02J 7/0047; H02J 7/0027; H02J 7/025; H02J 2007/0096; H02J 50/10
See application file for complete search history.

(56) References Cited

U.S. PATENT DOCUMENTS 8,311,592 B2   11/2012   Song
8,947,042 B2 *   2/2015   Kirby ..................... H02J 5/005
                                                                    320/108

(Continued)

FOREIGN PATENT DOCUMENTS

WO    2017012979 A1    1/2017

OTHER PUBLICATIONS

International Patent Application No. PCT/US2018/013500—International Search Report Written Opinion dated Mar. 14, 2018.

(Continued)

*Primary Examiner* — Adnan Aziz
(74) *Attorney, Agent, or Firm* — Dickinson Wright RLLP

(57) ABSTRACT

The embodiments set forth a technique for coordinating notifications across computing devices placed onto a wireless charging apparatus. According to some embodiments, the technique can involve the wireless charging apparatus (1) receiving, from a first computing device, first information that includes (i) a first unique identifier (ID) associated with the first computing device, and (ii) one or more unique IDs that are each associated with a respective auxiliary computing device known to the first computing device. Subsequently, the wireless charging apparatus can receive, from a second computing device, second information that at least includes a second unique ID associated with the second computing device. Finally, the wireless charging apparatus can, in response to determining that the second unique ID is included in the one or more unique IDs, and cause both the first and second computing devices to display respective notifications in a coordinated manner.

20 Claims, 9 Drawing Sheets

Related U.S. Application Data

(60) Provisional application No. 62/556,362, filed on Sep. 9, 2017, provisional application No. 62/514,875, filed on Jun. 4, 2017.

(56) References Cited

U.S. PATENT DOCUMENTS

| | | | |
|---|---|---|---|
| 9,538,382 | B2 | 1/2017 | Bell et al. |
| 9,565,255 | B2 | 2/2017 | Kapoor et al. |
| 9,852,098 | B2 * | 12/2017 | Gagne-Keats .... H04M 1/72527 |
| 10,270,270 | B2 | 4/2019 | Garbus et al. |
| 2001/0005682 | A1 | 6/2001 | Terao et al. |
| 2006/0116175 | A1 * | 6/2006 | Chu .................. H04M 1/72569 |
| | | | 455/567 |
| 2012/0052922 | A1 | 3/2012 | Li |
| 2012/0112539 | A1 * | 5/2012 | Yamamoto ............ H02J 7/0021 |
| | | | 307/11 |
| 2013/0076594 | A1 | 3/2013 | Sirpal et al. |
| 2013/0091225 | A1 | 4/2013 | Eaton |
| 2014/0364173 | A1 * | 12/2014 | Tuli .................... H04B 1/3883 |
| | | | 455/573 |
| 2015/0054458 | A1 | 2/2015 | Yoon et al. |
| 2015/0056920 | A1 * | 2/2015 | Huttunen ................ H04W 8/22 |
| | | | 455/41.2 |
| 2015/0130623 | A1 | 5/2015 | Robison |
| 2015/0137746 | A1 | 5/2015 | Lee et al. |
| 2015/0160622 | A1 | 6/2015 | Kim et al. |
| 2015/0244201 | A1 | 8/2015 | Chu |
| 2015/0350146 | A1 | 12/2015 | Cary et al. |
| 2016/0063850 | A1 * | 3/2016 | Yang .................. H04M 1/72569 |
| | | | 340/539.22 |
| 2016/0174020 | A1 * | 6/2016 | Huttunen ............ H04M 1/7253 |
| | | | 455/41.2 |
| 2016/0191357 | A1 * | 6/2016 | Orner .................... H04W 24/02 |
| | | | 370/328 |
| 2016/0374049 | A1 | 12/2016 | Ha et al. |
| 2016/0380464 | A1 * | 12/2016 | Chin ...................... H02J 7/025 |
| | | | 320/108 |
| 2017/0055110 | A1 | 2/2017 | Tian et al. |
| 2017/0133881 | A1 | 5/2017 | Cho et al. |

OTHER PUBLICATIONS

Lixin Shi et al., Wireless Power Hot spot that Charges All of Your Devices, 1-38 MobiCom '15 Proceedings of the 21st Annual International Conference on Mobile Computing and Networking, Paris. France, Sep. 2015, pp. 2-13.

* cited by examiner

COORDINATING COMPLEMENTARY NOTIFICATIONS ACROSS RELATED COMPUTING DEVICES CONNECTED TO A WIRELESS CHARGING APPARATUS

CROSS-REFERENCE TO RELATED APPLICATIONS

The present application is a continuation of U.S. patent application Ser. No. 15/721,478, entitled "COORDINATING COMPLEMENTARY NOTIFICATIONS ACROSS RELATED COMPUTING DEVICES CONNECTED TO A WIRELESS CHARGING APPARATUS," filed Sep. 29, 2017, now U.S. Pat. No. 10,270,270, issued Apr. 23, 2019, which claims the benefit of U.S. Provisional Application No. 62/514,875, entitled "SYNCHRONIZING COMPLEMENTARY NOTIFICATIONS ACROSS RELATED COMPUTING DEVICES CONNECTED TO A WIRELESS CHARGING APPARATUS," filed Jun. 4, 2017, and U.S. Provisional Application No. 62/556,362, entitled "COORDINATING COMPLEMENTARY NOTIFICATIONS ACROSS RELATED COMPUTING DEVICES CONNECTED TO A WIRELESS CHARGING APPARATUS," filed Sep. 9, 2017, the contents of which are incorporated herein by reference in their entirety for all purposes.

FIELD

The described embodiments relate generally to a wireless (e.g., inductive) charging apparatus capable of receiving/charging two or more computing devices. More particularly, the described embodiments involve enabling related computing devices to display complementary notifications in a coordinated manner as they are placed onto and removed from the wireless charging apparatus.

BACKGROUND

Recent years have shown a proliferation in the average number and types of computing devices that are owned by individuals. For example, it is common for an individual to own a laptop device, a tablet device, a smartphone device, a wearable device (e.g., fitness tracker), a pair of headphones, and so on. Notably, owning these devices can deliver a rich user experience as each device can provide specialized functionality to meet a given user's needs throughout the day. However, owning these devices can also present the ongoing challenge of effectively managing the charge levels of the batteries included in these devices so they can be readily utilized when needed. For example, charging multiple devices typically involves a mass of cables that consumes space and is difficult to manage. Moreover, many of the aforementioned devices lack the capability to display their battery statuses in a user-friendly manner. For example, battery statuses for wearable devices typically are presented via small displays or LEDs that can be difficult for users to interpret. As a result, users often fail to properly maintain the battery levels of their devices, which leads to frustrating scenarios where a device is needed but cannot power-on or function for a desirable amount of time.

SUMMARY

To cure the foregoing deficiencies, the representative embodiments set forth herein disclose various techniques for enabling related computing devices to display complementary notifications in a coordinated manner as they are placed onto and removed from a wireless charging apparatus.

According to some embodiments, a wireless charging apparatus can be configured to implement a method for carrying out the techniques described herein. In particular, the method can include the steps of (1) receiving, from a first computing device communicably coupled to the wireless charging apparatus, first information that includes (i) a first unique identifier (ID) associated with the first computing device, and (ii) one or more unique IDs that are each associated with a respective auxiliary computing device known to the first computing device, (2) receiving, from a second computing device communicably coupled to the wireless charging apparatus, second information that at least includes a second unique ID associated with the second computing device, and (3) in response to determining that the second unique ID is included in the one or more unique IDs: causing both the first and second computing devices to display respective notifications in a coordinated manner.

According to some embodiments, a computing device can also be configured to implement a method for carrying out the techniques described herein. In particular, the method can include the steps of (1) providing, in response to establishing a communication channel with a wireless charging apparatus, (i) a first unique ID associated with the computing device, and (ii) one or more unique IDs that are each associated with a respective auxiliary computing device known to the computing device, (2) receiving, from the wireless charging apparatus, a notification that a second computing device among the respective auxiliary computing devices is communicatively coupled to the wireless charging apparatus, wherein the notification includes a second battery status associated with the second computing device, (3) indicating, to the wireless charging apparatus, a time delay by which a second indication of the second battery status is to be displayed by the second computing device, and (4) displaying the second indication of the second battery status in accordance with the time delay.

Additionally, and according to some embodiments, a first computing device can be configured to participate in coordinated notifications (with other computing devices) in association with being placed onto and removed from a wireless charging apparatus. In particular, the first computing device can be configured to carry out steps that include (1) detecting a placement of the first computing device on the wireless charging apparatus. According to some embodiments, the first computing device can be configured to output a first indication of a first battery status of the first computing device in response to being placed on the wireless charging apparatus. Additionally, the steps can include (2) receiving a notification that a second computing device is placed on the wireless charging apparatus, (3) in response to identifying that the second computing device is known to the first computing device: receiving a second battery status associated with the second computing device, (4) indicating, to the second computing device, when a second indication of the second battery status is to be output by the second computing device, and (5) outputting the second indication of the second battery status. According to some embodiments, the second battery status can be output by both the first computing device and the second computing device in a coordinated manner. According to some embodiments, the first computing device and the second computing device communicate with one another over a cellular connection, a Bluetooth connection, a Near Field Communication (NFC) connection, or a WiFi connection.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
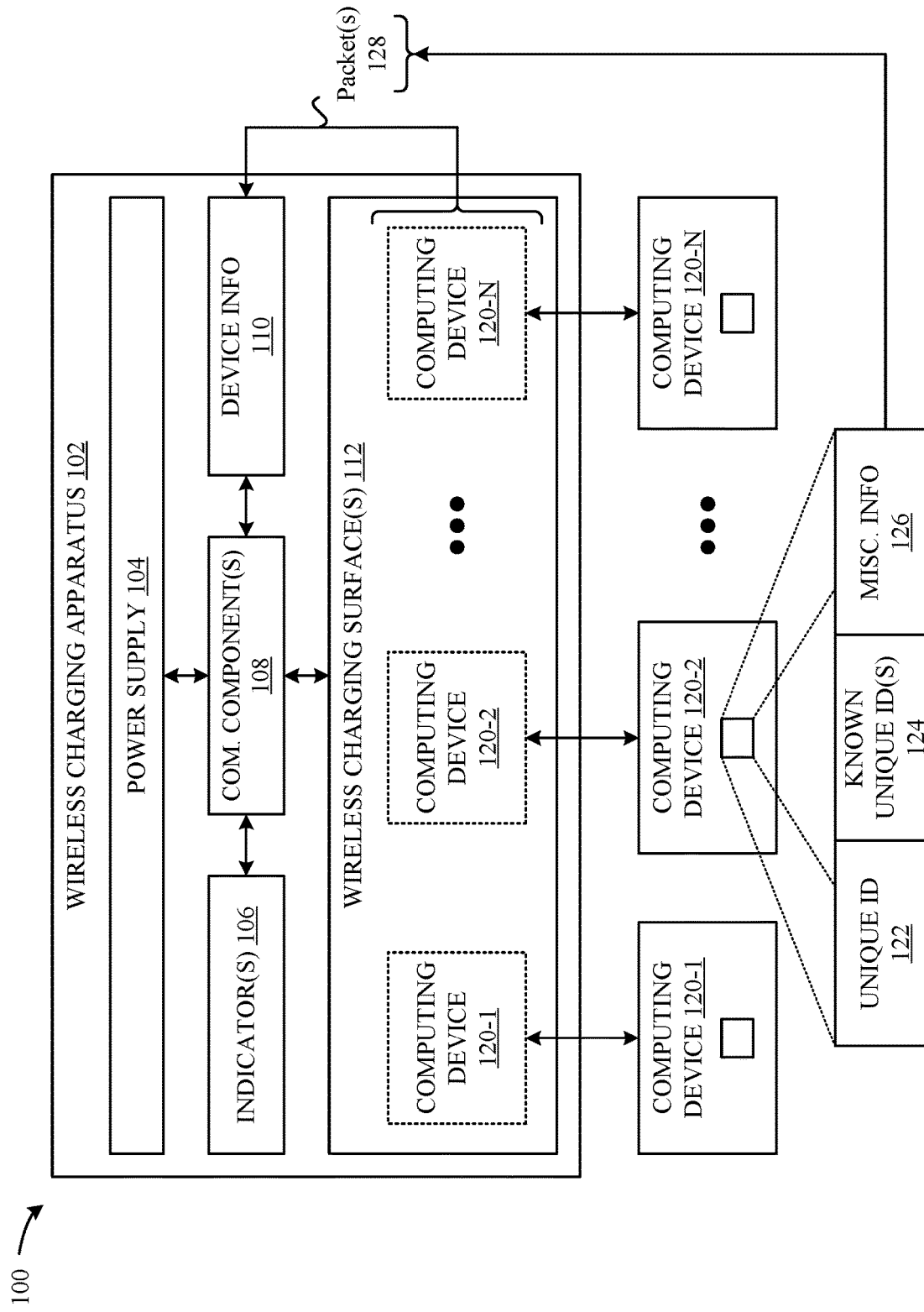
FIG. 1 illustrates a block diagram of different computing devices that can be configured to implement different aspects of the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for coordinating complementary notifications across related computing devices they are placed on to and removed from a wireless charging apparatus. According to some embodiments, the wireless charging apparatus can be configured to receive information from each computing device as it is placed onto the wireless charging apparatus. This information can include, for example, a unique identifier (ID) associated with the computing device, one or more unique IDs of other computing devices known to the computing device (e.g., previously/actively paired computing devices), and a battery status of the computing device. In this manner, as new computing devices are placed onto the wireless charging apparatus, the wireless charging apparatus can reference the unique IDs to identify when at least two related computing devices are present. For example, when the wireless charging apparatus identifies that a first computing device and a second computing device are (1) placed on the wireless charging apparatus, and (2) related to one another, the wireless charging apparatus can cause the first computing device to display information about the second computing device on behalf of or in conjunction with information displayed by the second computing device.

Consider, for example, a scenario in which the first computing device is a smartphone device, and the second computing device is a smaller device that is related to the smartphone device (e.g., a smart watch device). In this scenario, when the smart watch device is placed onto the wireless charging apparatus (with the smartphone device already present), the wireless charging apparatus can (1) identify the relationship between the devices, and (2) notify the smartphone device of the presence/battery status of the smart watch device. In turn, the smartphone device can produce a notification associated with the battery status of the smart watch device, e.g., through one or more animations/sounds that provide a pleasant user experience. As mentioned above, the smart watch device can also be configured to produce a notification in conjunction with the notification produced by the smartphone device. In particular, the smartphone device can be configured to indicate, to the wireless charging apparatus, a time delay that will be honored by the smartphone device prior to producing the notification associated with the battery status of the smart watch device. In turn, the wireless charging apparatus provides the time delay to the smart watch device. In this manner, the smart watch device can display, in accordance with the time delay, a notification that includes one or more animations/sounds that complement the animations/sounds included in the notification produced by the smartphone device.

Additionally, it is noted that the smartphone device and the smart watch device can periodically/responsively issue relevant updates to the wireless charging apparatus while they remain connected to the wireless charging apparatus. For example, the smartphone device can indicate to the wireless charging apparatus whether it is appropriate for the smartphone device to display a notification associated with the smart watch device. The appropriateness can be based on, for example, whether the smartphone device is locked/unlocked, in-use/not in use, and so on. For example, when the smartphone device is in an unlocked state/in-use, the smartphone device can refuse to display any notifications associated with the smart watch device. Alternatively, the smartphone device can display an unobtrusive notification (e.g., a popup) of the battery status of the smart watch device to keep a user informed. Additionally, each of the smartphone device and the smart watch device can provide battery status updates to the wireless charging apparatus as they are charged to enable a variety of useful features to be implemented. This can enable, for example, the smartphone device to display the latest battery status of the smart watch device when the smart watch device is removed from the wireless charging surface, thereby enhancing the user experience.

A more detailed discussion of these techniques is set forth below and described in conjunction with FIGS. 1, 2A-2D, and 3-6, which illustrate detailed diagrams of systems and methods that can be used to implement these techniques.

FIG. 1 illustrates a block diagram 100 of different computing devices that can be configured to implement various aspects of the techniques described herein, according to some embodiments. Specifically, FIG. 1 illustrates a high-level overview of a wireless charging apparatus 102 that is configured to communicate with and provide an electrical charge to different computing devices 120. Although not illustrated in FIG. 1, it is understood that the wireless charging apparatus 102 and the computing devices 120 each can include at least one processor, at least one memory, and at least one storage device that collectively enable these devices to operate in accordance with this disclosure. For example, in a given device, instructions can be stored in the at least one storage device and loaded into the at least one memory for execution by the at least one processor to enable the techniques described herein to be implemented.

As shown in FIG. 1, the wireless charging apparatus 102 can include a power supply 104, one or more indicators 106, a memory (not illustrated in FIG. 1) for storing device information 110, one or more communications components 108, and at least one wireless charging surface 112. According to some embodiments, the wireless charging surface 112 can implement any form of wireless (e.g., inductive) charging technology to enable one or more computing devices 120 to receive a charge when placed in proximity to (e.g., directly onto) the wireless charging surface 112. For example, the wireless charging surface 112 can implement Qi wireless charging technology, Power Matters Alliance (PMA) technology, or any other form of wireless charging technology. It is noted, however, that wireless charging techniques are not required to implement the techniques described herein. On the contrary, the wireless charging surface 112 can be replaced or supplemented by any component (e.g., a conductor-based charging component) that enables computing devices 120 to receive a charge and communicate with the wireless charging apparatus 102.

According to some embodiments, the indicators 106 included in the wireless charging apparatus 102 can include, for example, light emitting diodes (LEDs) that indicate a variety of information to an end-user of the wireless charging apparatus 102. For example, the LEDs can indicate whether the power supply 104 is receiving power from a power source, whether at least one computing device 120 is properly connected to and being charged via the wireless charging surface 112, and so on. According to some embodiments, the communications component 108 can enable the wireless charging apparatus 102 to transmit information to and receive information from the computing devices 120. According to some embodiments, this information can be transmitted between the wireless charging apparatus 102 and the computing devices 120 using "in-band" communications that coincide with any wireless charging technology implemented by the wireless charging apparatus 102. In this manner, pre-existing relationships—e.g., Bluetooth pairings, Near Field Communication (NFC) pairing, WiFi pairings, etc.—are not required for the wireless charging apparatus 102 to effectively communicate with the computing devices 120. Moreover, implementing in-band communications can enable the wireless charging apparatus 102 to communicate with a given computing device 120 even when the computing device 120 is operating in a minimal mode—e.g., airplane mode—where the primary communications components (e.g., cellular, Bluetooth, NFC, WiFi, etc.) within the computing device 120 are disabled. As described in greater detail herein, it is noted that while the techniques primarily involve the computing devices 120 communicating with the wireless charging apparatus 102, other approaches can be used without departing from the scope of this disclosure. For example, direct communication links (e.g., cellular, Bluetooth, NFC, WiFi, etc.) between the computing devices 120 can supplement or supplant the communications that take place by way of the wireless charging apparatus 102 to achieve the same or similar results.

It is noted that the internal components of the wireless charging apparatus 102 illustrated in FIG. 1 and described herein do not represent an exhaustive list of what can be included in the wireless charging apparatus 102. On the contrary, the wireless charging apparatus 102 can include any number of components that contribute to or supplement the embodiments described herein. For example, the wireless charging apparatus 102 can include display devices/speakers that can be used to inform end-users about information associated with the wireless charging apparatus 102 and/or the computing devices 120. In another example, the wireless charging apparatus 102 can include any form of input device to enable interactions with the wireless charging apparatus 102 to take place, e.g., touch-screens, biometric sensors, buttons, dials, sliders, and so on. In yet another example, the wireless charging apparatus 102 can include any communication components (e.g., cellular, Bluetooth, NFC, WiFi, etc.) to enable the wireless charging apparatus 102 to communicate with the computing devices 120.

According to some embodiments, the device information 110 can be used by the wireless charging apparatus 102 to manage the flow of information between the computing devices 120 in accordance with the techniques described herein. For example, when a computing device 120 is placed onto the wireless charging apparatus 102, the computing device 120 can transmit, e.g., via the in-band communications described herein, one or more packets 128 that include relevant information to enable the techniques described herein to be effectively implemented. For example, as shown in FIG. 1, a packet 128 transmitted by a computing device 120 can include a unique identifier (ID) 122 for the computing device 120, one or more known unique IDs 122 of other computing devices 120 known to the computing device 120, and miscellaneous information 126 associated with the computing device 120, the purposes of which are described below in greater detail.

According to some embodiments, the unique ID 122 can take any form that enables the computing device 120 to be uniquely identifiable. For example, the unique ID 122 can be based on hardware/software properties (e.g., identifiers) associated with the computing device 120. However, in some cases it can be desirable to separate the unique ID 122 from properties of the computing device 120, especially in the interest of preserving privacy. For example, the unique ID 122 can be a randomly-generated string that is unrelated to the hardware/software properties of the computing device 120. In this manner, nearby malicious devices attempting to snoop on information transmitted between the computing device 120 and the wireless charging apparatus 102 will only be able to gather innocuous data. Moreover, the embodiments described herein can involve periodically refreshing the unique IDs 122 of the computing devices 120 to further-thwart any malicious activity that may be attempted.

As described above, the packet(s) 128 transmitted by the computing device 120 can also one or more known unique IDs 124, which represent the unique IDs 122 of other computing devices 120 that are relevant to the computing device 120. According to some embodiments, these other computing devices 120 can represent devices with which the computing device 120 is actively paired or previously paired, e.g., wearable devices, headphones, speakers, sensors, and so on, that can directly communicate with the computing device 120 (e.g., cellular, Bluetooth, NFC, WiFi, etc.). In this manner, and as described in greater detail herein, the wireless charging apparatus 102 can utilize the unique IDs 122 and the known unique IDs 124 provided by various computing devices 120 to identify when interactions should take place between specific ones of the computing devices 120. Additionally, and as described above, the packet(s) 128 transmitted by a computing device 120 can include miscellaneous information 126 about the computing device 120 that can be utilized by the wireless charging apparatus 102 to implement the techniques described herein. For example, the miscellaneous information 126 can include an indication of a type of the computing device 120, including model information associated with the computing device 120 (e.g., a device name, model, color, etc.), state information associated with the computing device 120 (e.g., locked/unlocked), battery information associated with the computing device 120, and so on.

Additionally, and although not illustrated in FIG. 1, it will be understood that the various computing devices 120 described herein include hardware/software components that enable the computing devices 120 to interface with the wireless charging apparatus 102, which can include, for example, receiving energy from the wireless charging apparatus 102 (e.g., via the wireless charging surface 112), communicating with the wireless charging apparatus 102, and so on. It will be further understood that the various computing devices 120 can include hardware/software elements that enable the computing devices 120 to implement the techniques described herein at varying levels. For example, computing devices 120 having larger display devices (e.g., laptops, tablets, smartphones, etc.) can be designated as primary/high-priority devices that display information about known computing devices 120 as they are placed onto/removed from the wireless charging apparatus 102. Continuing with this example, computing devices 120 having smaller displays (e.g., smart watches) can be designated as secondary/low priority devices that should only display information when the primary/high-priority devices are not present on the wireless charging apparatus 102. For example, when only a smart watch computing device 120 is present on the wireless charging apparatus 102, and a pair of wireless headphones is placed onto the wireless charging apparatus 102, the smart watch computing device 120 can take on the responsibility of displaying information about the wireless headphones in conjunction with/on behalf of the wireless headphones. It is noted that the foregoing examples are not meant to be exhausting in any way, and that the computing devices 120 described herein can be configured in any fashion to achieve different variations on the techniques described herein.

Accordingly, FIG. 1 sets forth an overview of different configurations of the wireless charging apparatus 102/computing devices 120 that can be utilized to enable the implementation of the embodiments described herein. As described in greater detail below, these components can be utilized to provide a rich user experience through coordinated/complementary notifications when two or more related computing devices 120 are placed onto the wireless charging apparatus 102 for charging.

Figure 2A:
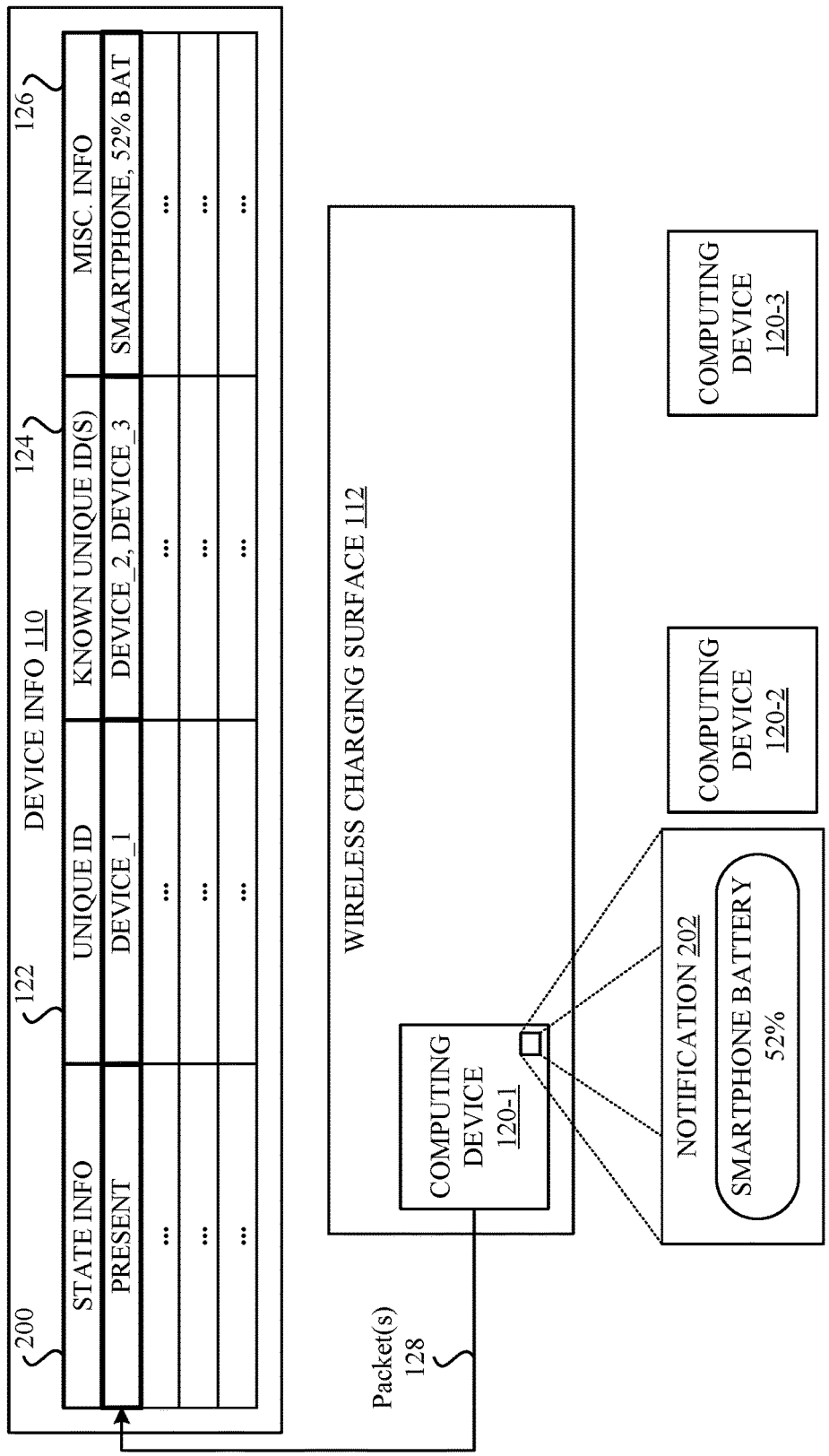
FIGS. 2A-2D illustrate conceptual diagrams of example computing devices displaying complementary notifications in a coordinated manner as they are placed onto and removed from the wireless charging apparatus, according to some embodiments.

FIGS. 2A-2D illustrate conceptual diagrams of example computing devices 120 displaying complementary notifications in a coordinated manner as they are placed onto and removed from the wireless charging apparatus 102, according to some embodiments. As shown in FIG. 2A, a first step 210 can involve a computing device 120-1 being placed onto the wireless charging apparatus 102. This can represent, for example, when a user places the computing device 120-1 onto the wireless charging apparatus 102 with the intent to charge the computing device 120-1 via the wireless charging techniques described herein. As shown in FIG. 2A, step 210 can involve the computing device 120-1 transmitting one or more packets 128 to the wireless charging apparatus 102. As previously described above, these packets 128 can include information associated with the computing device 120-1, e.g., a unique ID 122, known unique IDs 124, and miscellaneous information 126.

As shown in FIG. 2A, example information transmitted by the packets 128 is placed into the device information 110 by the wireless charging apparatus 102. For example, the value "DEVICE_1" can be assigned as the unique ID 122, the values "DEVICE_2" and "DEVICE_3" can be assigned as the known unique IDs 124, and the value "SMARTPHONE, 52% BAT" can be assigned as the miscellaneous information 126. In this example, the computing device 120-1 has an assigned unique ID 122 of "DEVICE_1", where the computing device 120-1 has been previously paired with two other computing devices 120—a computing device 120-2 having the unique ID 122 "DEVICE_2", and a computing device 120-3 having the unique ID 122 "DEVICE_3". Moreover, in this example the computing device 120-1 is a smartphone device whose battery level is at 52% when the computing device 120-1 is placed onto the wireless charging apparatus 102. Additionally, as shown in FIG. 2A, the wireless charging apparatus 102 can assign, within the device information 110 for the computing device 120-1, a "STATE INFO" property 200 that identifies whether the computing device 120-1 is present on or absent from the wireless charging apparatus 102. The "STATE INFO" property 200 can also identify additional information about the computing device 120-1, e.g., whether the computing device 120-1 is assigned as a high-priority device/low-priority device for displaying complementary notifications associated with other related computing devices 120 that are placed onto the wireless charging apparatus 102 (as previously described above). As described in greater detail herein, the "STATE INFO" property 200 can enable the wireless charging apparatus 102 to appropriately respond to and instruct the other computing devices 120-2,3 when they are placed onto/removed from the wireless charging apparatus 102.

In the example illustrated in FIG. 2A, the computing device 120-1 is the first and only computing device 120 present on wireless charging apparatus 102. In this regard, and according to some embodiments, the computing device 120-1 can be responsible for displaying its own battery status, which is illustrated in FIG. 2A as the notification 202. As shown in FIG. 2A, the notification 202 can indicate, by way of one or more animations/sounds, (1) the type of the computing device 120-1 (i.e., "SMARTPHONE"), and (2) the battery status for the computing device 120-1. It is noted that the content associated with the notification 202 illustrated in FIG. 2A is merely exemplary, and that any content, in any form, sequence, manner, etc., can be utilized when producing the notification 202.

Figure 2B:
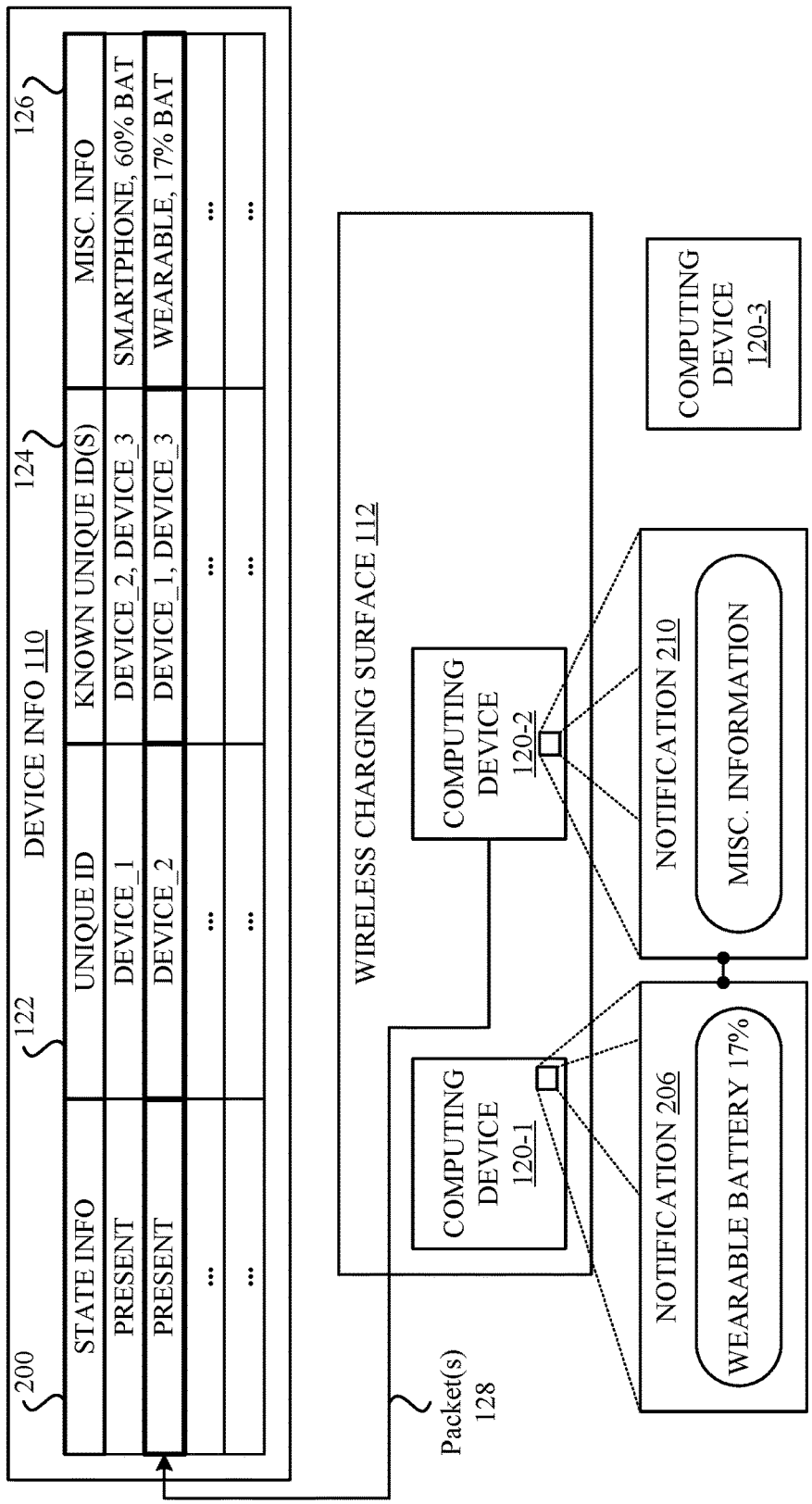

Accordingly, at the conclusion of the first step 210 illustrated in FIG. 2A, the first computing device 120-1 provides useful information via the notification 202, and is receiving power from the wireless charging apparatus 102 to charge any internal batteries included in the computing device 120-1. At this point, the computing device 120-1 can now function as a supplemental device for displaying complementary notifications associated with the computing devices 120-2,3 when they are placed onto the wireless charging apparatus 102. For example, a second step 220 illustrated in FIG. 2B can involve the computing device 120-2 being placed onto the wireless charging apparatus 102. As shown in FIG. 2B, and in accordance with the techniques described herein, the computing device 120-2 can provide, via one or more packets 128, information about the computing device 120-2 to the wireless charging apparatus 102. For example, the computing device 120-2 can provide the value "DEVICE_2" as the unique ID 122, the values "DEVICE_1" and "DEVICE_3" as the known unique IDs 124, and the value "WEARABLE, 17% BAT" as the miscellaneous information 126. For example, in FIG. 2A, the computing device 120-2 can represent a smart watch, a fitness tracker, an augmented reality device, a sensor, and so on.

As a brief aside, it is noted that each of the computing devices 120 placed onto the wireless charging apparatus 102 can periodically/responsively issue packets 128 to provide relevant updates to the wireless charging apparatus 102. For example, the device information 110 can be updated to manage a status property for each computing device 120 that indicates whether the computing device 120 is capable of displaying a complementary notification. Again, this can be based on, for example, whether the computing device 120 is locked/unlocked, in-use/not in use, and so on. In another example, the device information 110 can be updated to reflect the battery statuses of the computing devices 120 as they are charged via the wireless charging apparatus 102, e.g., as shown by the battery status of the computing device 120-1 advancing from 52% to 60% between the times at which step 210 of FIG. 2A and step 220 of FIG. 2B occur. Notably, a variety of useful features can be implemented by keeping the battery statuses up-to-date within the device information 110. For example, when a pair of headphones is removed from the wireless charging apparatus 102, and an associated device having a display (e.g., a laptop, a tablet, a smartphone, a smart watch, etc.) remains on the wireless charging apparatus 102, the associated device can display an indication of the latest battery status of the headphones. In this manner, a user who is removing the headphones from the wireless charging apparatus 102 can promptly receive an easy-to-read indication (via the display of the associated device) of the battery status of the headphones, thereby enhancing the user experience.

Additionally, by updating the information described herein, one or more of the computing devices 120 can promptly display a summary of information about associated devices that are placed onto the wireless charging apparatus 102. This can occur, for example, when a trigger occurs at a given computing device 120, e.g., when a home/power button is pressed on the computing device 120, when the computing device 120 is moved while placed on the wireless charging apparatus 102 (e.g., nudged by a user), when the computing device 120 detects that a user is in proximity to the computing device 120, and so on. For example, when a smartphone, a smart watch, and a pair of headphones are charging on the wireless charging apparatus 102, the smartphone can be configured to display, in response to any of the aforementioned triggers, an up-to-date summary of its own battery status, the battery status of the smart watch, and the battery status of the headphones. According to some embodiments, the smartphone can also be configured to cause one or more of the smart watch/headphones to present information through the complementary notifications in a coordinated manner.

Returning back now to FIG. 2B, it is noted that, according to some embodiments, the computing devices 120 can be configured to omit known unique IDs 124 from the packets 128 any time they represent redundant information. Consider, for example, a first computing device 120 that is paired only with a second computing device 120 (and vice-versa). In this example, when the first computing device 120 is placed onto the wireless charging apparatus 102 and provides a known unique ID 124 that corresponds to the unique ID 122 of the second computing device, it would be redundant for the second computing device 120 to provide a known unique ID 124 that corresponds to the unique ID 122 of the first computing device 120. Instead, the wireless charging apparatus 102 can readily identify the relationship by comparing the unique ID 122 of the second computing device 120 against the known unique IDs 124 of the first computing device 120 (managed within the device information 110) to identify the relationship, and carry out the same techniques described herein in accordance with the identification of the relationship.

In any case, when the information associated with the computing device 120-2 is incorporated into the device information 110, the wireless charging apparatus 102 can identify that the computing device 120-1 and the computing device 120-2 are relevant to one another. In turn, the wireless charging apparatus 102 can query the computing device 120-1 (e.g., via one or more packets 128) to identify whether the computing device 120-1 is willing to display a notification 206 in association with the computing device 120-2. According to some embodiments, the query can include the miscellaneous information 126 provided by the computing device 120-2 to minimize the number of messages transmitted between the computing device 120-1, the wireless charging apparatus 102, and the computing device 120-2, thereby reducing overall latency and improving the overall user experience. In particular, this approach will enable the computing device 120-1 to be in possession of the necessary information to display within the notification 206 should the computing device 120-1 accept the responsibility to do so. For example, the computing device 120-1 can indicate an acceptance to display the notification 206 when the computing device 120-1 remains on the wireless charging apparatus 102 and is in a locked and/or inactive state. Alternatively, the computing device 120-1 can indicate a refusal to display the notification 206 when the computing device 120-1 is in an unlocked state and/or is being actively utilized by a user.

In the example illustrated in FIG. 2B, the computing device 120-1 indicates, to the wireless charging apparatus 102, an acceptance to display the notification 206 in association with the computing device 120-2 being placed onto the wireless charging apparatus 102. According to some embodiments, the computing device 120-1 can indicate the acceptance by transmitting one or more packets 128 to the wireless charging apparatus 102. According to some embodiments, the packets 128 can indicate a time delay by which the computing device 120-1 plans on displaying the notification 206. In this manner, the wireless charging apparatus 102 can forward the time delay to the computing device 120-2, where the time delay also indirectly indicates to the computing device 120-2 an acceptance by the computing device 120-1 to display the notification 206. In turn, the computing device 120-2 can prepare to display a complementary notification 210 in accordance with the time delay provided by the computing device 120-1.

As shown in FIG. 2B, the notification 206 is displayed by the computing device 120-1 when the time delay is satisfied, and can indicate information about the computing device 120-2 through one or more animations/sounds. For example, the animations/sounds can display "WEARABLE BATTERY 17%". Moreover, in accordance with the satisfaction of the time delay, and in conjunction with the notification 206, the notification 210 produced by the computing device 120-2 can include miscellaneous information presented through one or more animations/sounds, e.g., when the computing device 120-2 includes a display device (e.g., a smart watch). In another example, when the computing device 120-2 does not include a display device, but includes one or more LEDs, the LED(s) can be utilized to communicate information to a user, e.g., pulsating animations that coincide with the animations/sounds displayed by the computing device 120-1. In another example, the LED(s) can display a solid orange light that indicates that the computing device 120-2 is being charged, a solid green light that indicates that the computing device 120-2 is fully charged, and so on. In any case, the user experience can be enhanced as useful information about the computing device 120-2 is displayed in an aesthetically-pleasing manner between the computing device 120-1 and the computing device 120-2 even when the computing device 120-2 includes only a small display device or no display device at all.

Figure 2C:
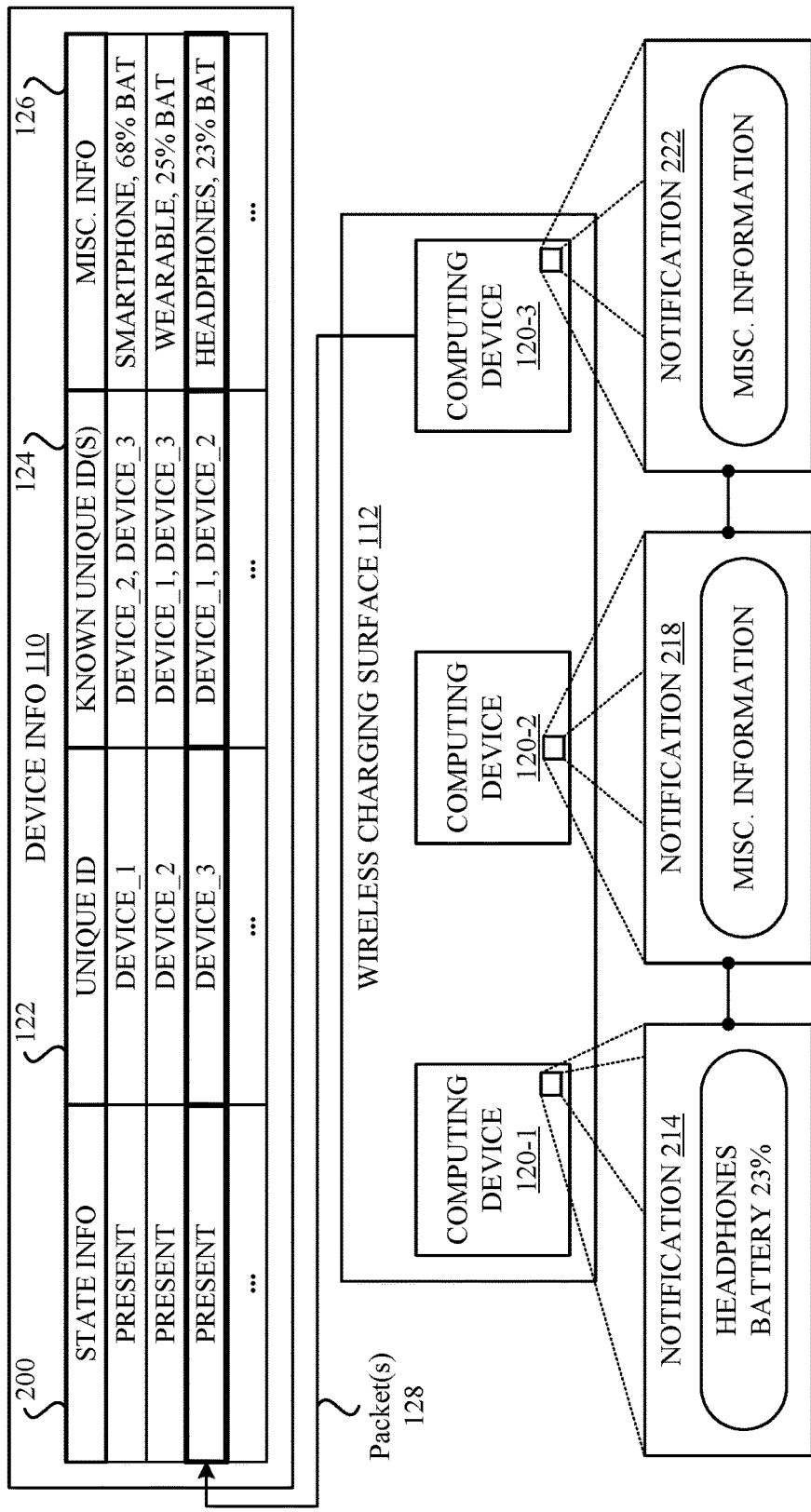

As described herein, computing devices 120 will regularly be placed onto the wireless charging apparatus 102 under expected use-case environments. To capture how the embodiments described herein manage such events, FIG. 2C illustrates a third step 230 in which a third computing device 120-3 is placed onto the wireless charging apparatus 102 (while the computing device 120-1 and the computing device 120-2 remain on the wireless charging apparatus 102). As shown in FIG. 2C, and in accordance with the techniques described herein, the computing device 120-3 can provide, via one or more packets 128, information about the computing device 120-3 to the wireless charging apparatus 102. For example, the computing device 120-3 can provide the value "DEVICE_3" as the unique ID 122, the values "DEVICE_1" and "DEVICE_2" as the known unique IDs 124, and the value "HEADPHONES, 23% BAT" as the miscellaneous information 126. For example, in FIG. 2C, the computing device 120-3 can represent a pair of wireless headphones associated with both the computing device 120-1 and the computing device 120-2.

As shown in FIG. 2C, and as previously described above, the wireless charging apparatus 102 can receive the packets 128 and add the information about the computing device 120-3 to the device information 110. In turn, the wireless charging apparatus 102 can identify that the computing device 120-1 and the computing device 120-2 are known to the computing device 120-3, and issue messages (e.g., via packets 128) that include information about the computing device 120-3. Again, such information can include a type of the computing device 120-3, a battery status of the computing device 120-3, and so on. In turn, the computing device 120-1 and the computing device 120-2 can indicate whether they are willing (as described herein) to display a notification in association with the appearance of the computing device 120-3. According to some embodiments, when two or more computing devices 120 are involved in displaying a notification, a primary computing device (e.g., the computing device 120-1) can indicate a time delay by which the notification should be displayed, where the other computing devices 120 act in accordance with the time delay.

For example, in FIG. 2C, the computing device 120-1 can indicate, to the wireless charging apparatus 102, a time delay at which a notification 214 will be displayed at the computing device 120-1. In turn, the wireless charging apparatus 102 can provide the time delay to both the computing device 120-2 and the computing device 120-3, whereupon the computing device 120-2 and the computing device 120-3 can prepare to display notifications 218 and 222, respectively. As shown in FIG. 2C, the notification 214 displayed by the computing device 120-1 can present the information "HEADPHONES BATTERY 23%" by way of one or more animations/sounds. Additionally, the notification 218 produced by the computing device 120-2 can communicate miscellaneous information about the computing device 120-3 by way of one or more animations/sounds. For example, continuing with the example scenario described above in which the computing device 120-2 represents a smart watch, the computing device 120-2 can display miscellaneous information in conjunction with the notification 214 displayed by the computing device 120-1. Additionally, in this example scenario, the notification 222 produced by the computing device 120-3 can be optional, and can be used communicate miscellaneous information by way of one or more animations/sounds in accordance with the time delay and one or more of the notification 214 and the notification 218. For example, the computing device 120-3—which, within FIG. 2C, can represent a pair of wireless headphones—can include an LED that operates in conjunction with the animations/sounds. In another example, one or more of the speakers included in the pair of wireless headphones can be used to play an audible sound that operates in conjunction with the animations/sounds.

Figure 2D:
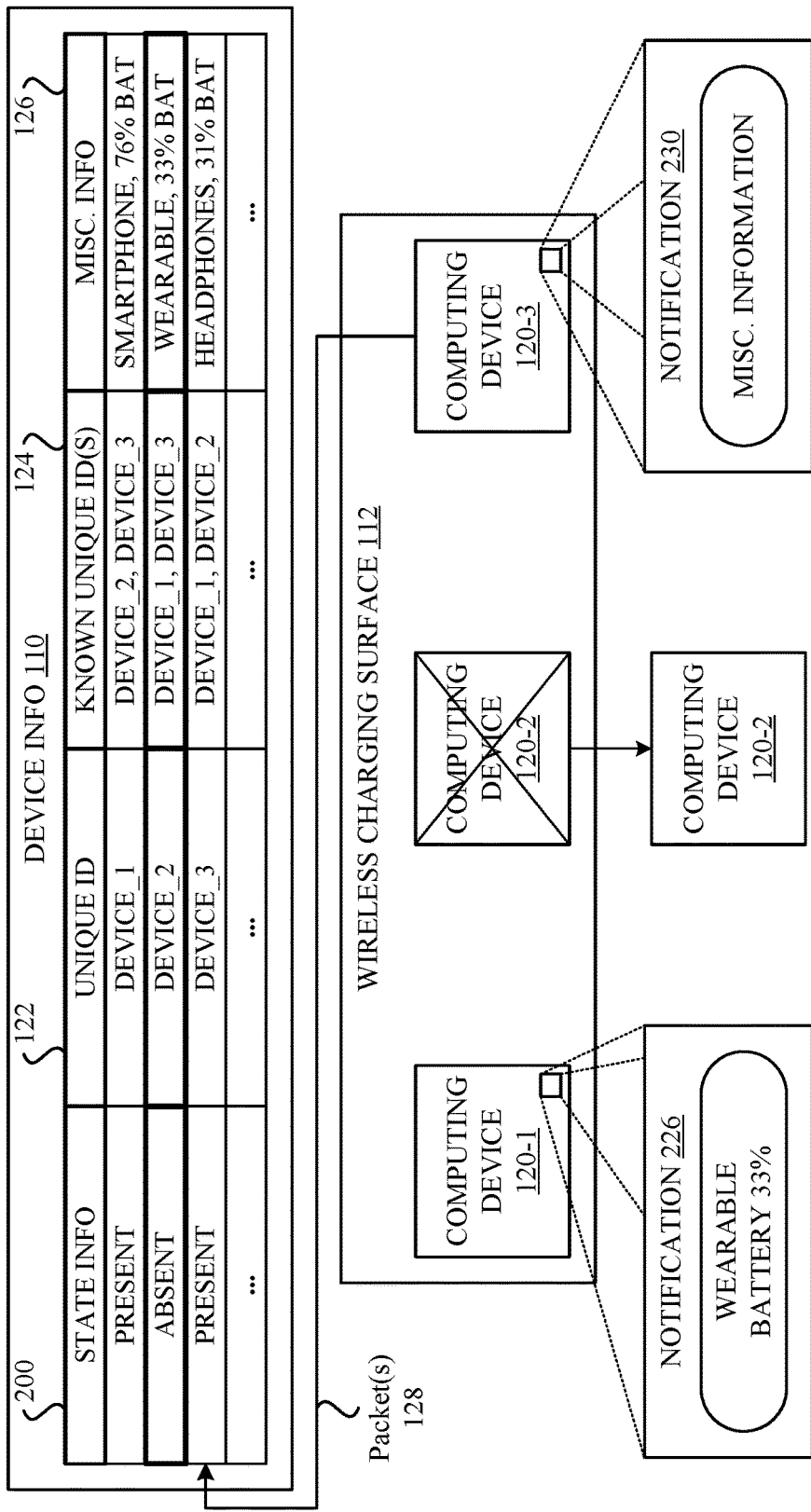

Additionally, it is noted that computing devices 120 will regularly be removed from the wireless charging apparatus 102 under expected use-case scenarios. To capture how the embodiments described herein manage such events, FIG. 2D illustrates a fourth step 240 in which the computing device 120-2 is removed from the wireless charging apparatus 102 (while the computing device 120-1 and the computing device 120-3 remain on the wireless charging apparatus 102). As shown in FIG. 2D, and in accordance with the techniques described herein, the device information 110 can be updated to reflect that the computing device 120-2 is now absent from the wireless charging apparatus 102. In turn, the wireless charging apparatus 102 can be configured to notify the related computing devices 120—i.e., the computing device 120-1 and the computing device 120-3—that the computing device 120-2 is no longer present. At this point, the computing device 120-1 can optionally display (e.g., if locked/in use, as described herein) a notification 226 that provides the up-to-date battery status of the computing device 120-2 by way of one or more animations/sounds. Additionally, the computing device 120-3 can optionally display a notification 230 that provides miscellaneous information (as previously described herein) about the computing device 120-2 by way of one or more animations/sounds.

Accordingly, FIGS. 2A-2D illustrate scenarios in which computing devices 120 can display, in a coordinated manner, complementary notifications in accordance with (1) their placement onto/removal from the wireless charging apparatus 102, and (2) the presence of other known computing devices 120. In association with FIGS. 2A-2D, additional FIGS. 3-5—which are described below—provide high-level breakdowns of the techniques described herein.

Figure 3:
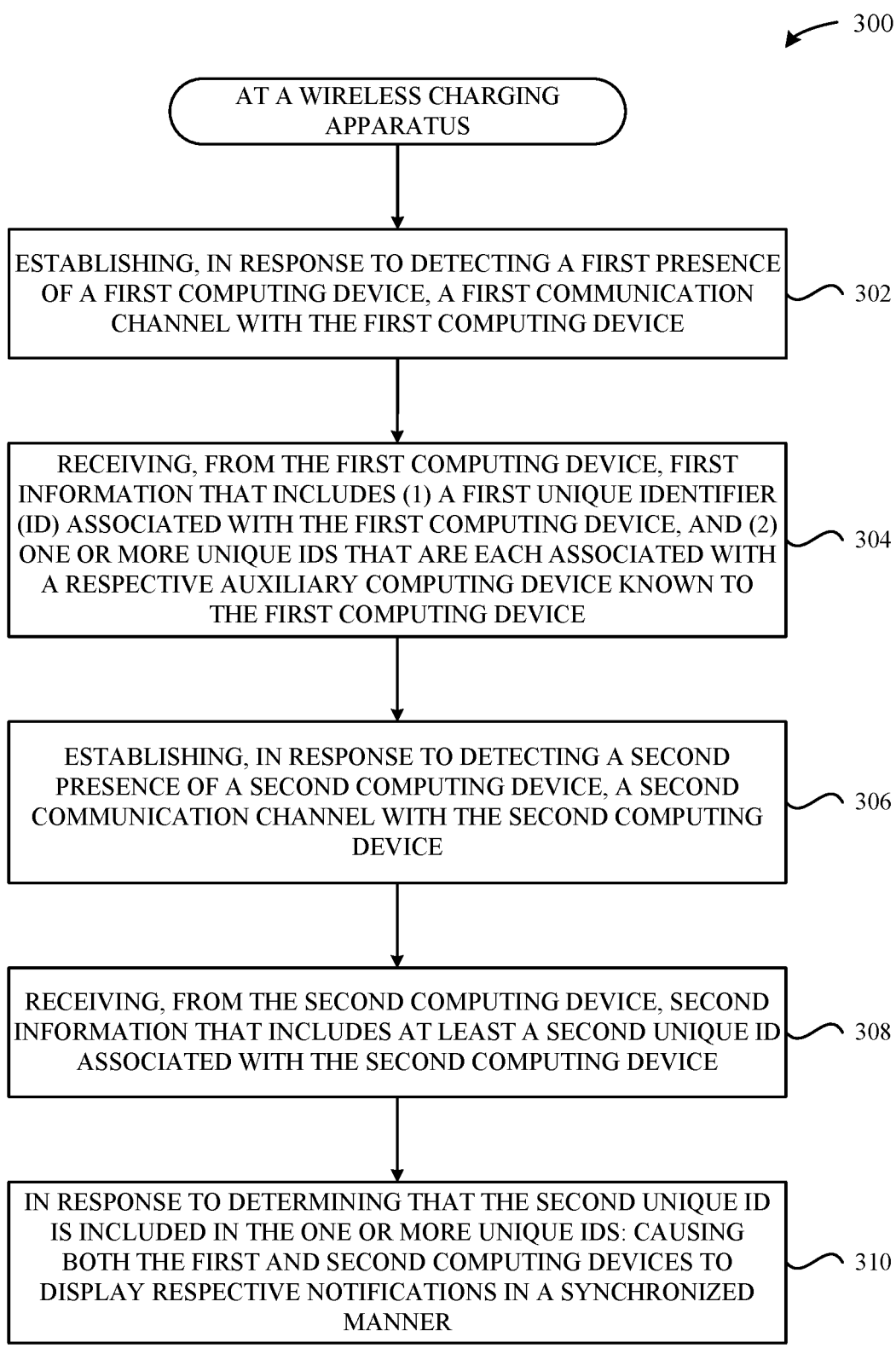
FIG. 3 illustrates a method that involves a wireless charging apparatus causing computing devices that are coupled to the wireless charging apparatus to display complementary notifications in a coordinated manner, according to some embodiments.

FIG. 3 illustrates a method 300 that involves the wireless charging apparatus 102 causing computing devices 120 that are coupled to the wireless charging apparatus 102 to display complementary notifications in a coordinated manner, according to some embodiments. As shown in FIG. 3, the method 300 begins at step 302, the wireless charging apparatus 102 establishes, in response to detecting a first presence of a first computing device 120, a first communication channel with the first computing device 120. Again, the communication channel can be an "in-band" communication channel associated with the wireless charging techniques implemented between the wireless charging apparatus 102 and the first computing device 120. However, it is noted that the techniques described herein are not limited only to such in-band communications, and that any form of communication can be utilized to enable the wireless charging apparatus 102 and the computing devices 120 to communicate with one another. For example, existing communication channels (e.g., cellular, Bluetooth, NFC, WiFi, etc.) formed between the wireless charging apparatus 102/computing devices 120 can be used to exchange information in lieu of/addition to the communication channels described herein. At step 304, the wireless charging apparatus 102 receives, from the first computing device 120, first information that includes (1) a first unique ID 122 associated with the first computing device 120, and (2) one or more unique IDs 124 that are each associated with a respective auxiliary computing device 120 known to the first computing device.

At step 306, the wireless charging apparatus 102 establishes, in response to detecting a second presence of a second computing device 120, a second communication channel with the second computing device 120. At step 308, the wireless charging apparatus 102 receives, from the second computing device 120, second information that includes (1) a second unique ID 122 associated with the second computing device 120. Notably, in step 308 the known unique IDs 124 associated with the second computing device 120 can be omitted from the second information when the known unique IDs 124 are redundant to the wireless charging apparatus 102, as previously described herein. However, it is by no means a requirement to omit the known unique IDs 124 at step 308. On the contrary, the second computing device 120 can be configured to provide a complete collection of the known unique IDs 124 to the wireless charging apparatus 102 to enable the wireless charging apparatus 102 to readily identify related computing devices 120 as they are placed onto and removed from the wireless charging apparatus 102.

Finally, at step 310, the wireless charging apparatus 102 determines that the second unique ID 122 is included in the one or more unique IDs 124 (provided by the first computing device 120), and, in response, causes both the first computing device 120 and the second computing device 120 to display respective notifications in a coordinated manner. The notifications can include, for example, information about one or more of the first computing device 120 and the second computing device 120 (e.g., device types, battery statuses, etc.).

Figure 4:
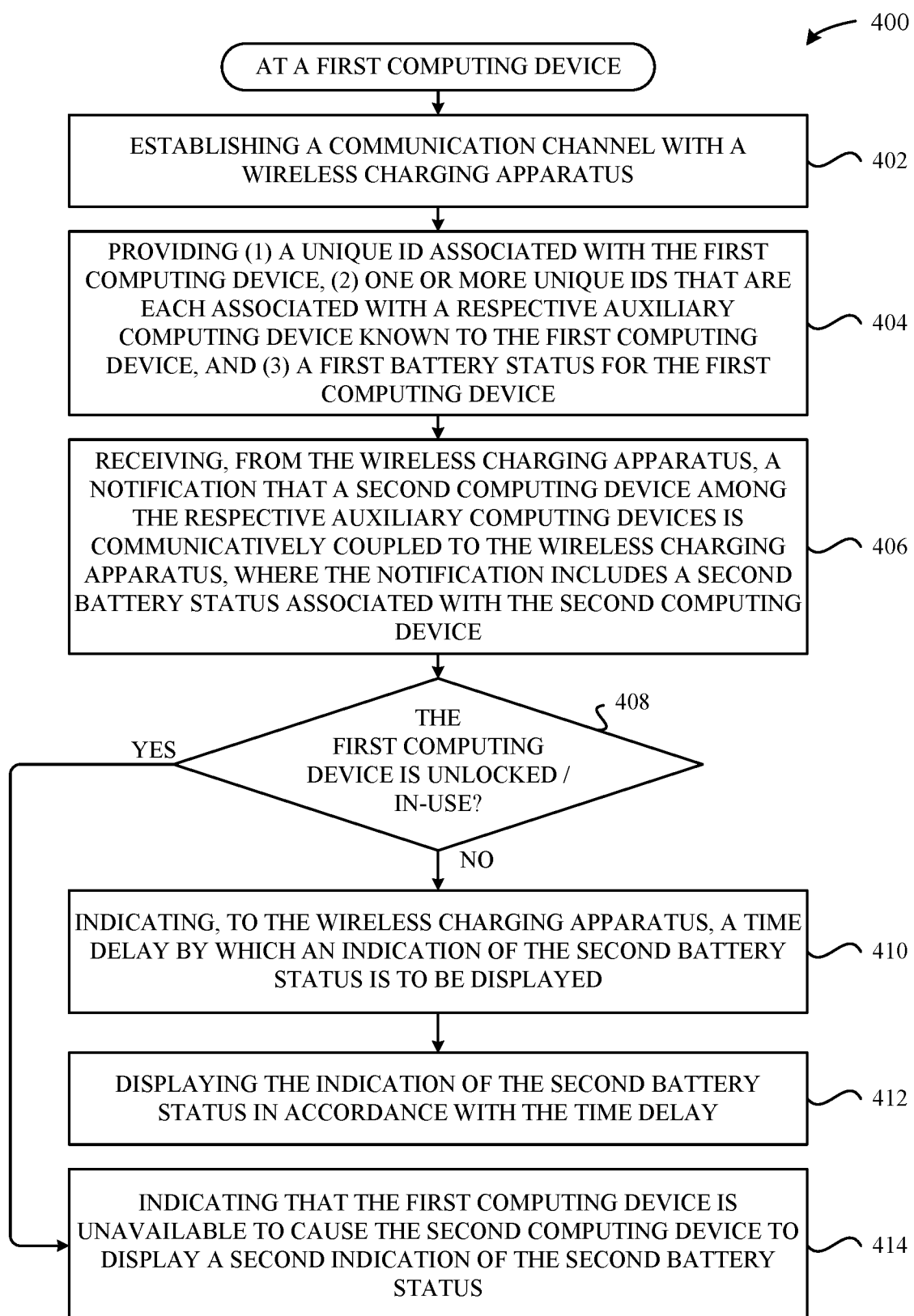
FIG. 4 illustrates a method that involves a first computing device coupling to a wireless charging apparatus and displaying complementary notifications in a coordinated manner with other related computing devices that are coupled to the wireless charging apparatus, according to some embodiments.

FIG. 4 illustrates a method 400 that involves a first computing device 120 coupling to the wireless charging apparatus 102 and displaying complementary notifications in a coordinated manner with other related computing devices 120 that are coupled to the wireless charging apparatus 102, according to some embodiments. As shown in FIG. 4, the method 400 begins at step 402, where the first computing device 120 establishes a communication channel with a wireless charging apparatus 102. At step 404, the first computing device 120 provides, by way of the communication channel, (1) a first unique ID 122 associated with the first computing device 120, (2) one or more unique IDs 124 that are each associated with a respective auxiliary computing device 120 known to the first computing device 120, and (3) a first battery status for the first computing device 120.

At step 406, the first computing device 120 receives, from the wireless charging apparatus 102, a notification that a second computing device 120 among the respective auxiliary computing devices 120 is communicatively coupled to the wireless charging apparatus 102, where the notification includes a second battery status associated with the second computing device 120. At step 408, the first computing device 120 determines whether the first computing device 120 is unlocked/in-use. If, at step 408, the first computing device 120 determines that the first computing device 120 is unlocked/in-use, then the method 400 transitions to step 414, where the first computing device 120 indicates that it will not display a notification in conjunction with the second computing device 120 being coupled to the wireless charging apparatus 102. Alternatively, if, at step 408, the first computing device 120 determines that the first computing device 120 is not unlocked/in-use, then the method 400 transitions to step 410, which is described below in greater detail.

At step 410, the first computing device 120 indicates, to the wireless charging apparatus 102, a time delay by which an indication of the second battery status is to be displayed by the first computing device 120. At step 412, the first computing device 120 displays the indication of the second battery status in accordance with the time delay. Although not illustrated in FIG. 4, it is noted that the second computing device 120 can also be configured to display animations/sounds in accordance with the time delay provided by the first computing device 120 (as described herein).

Figure 5:
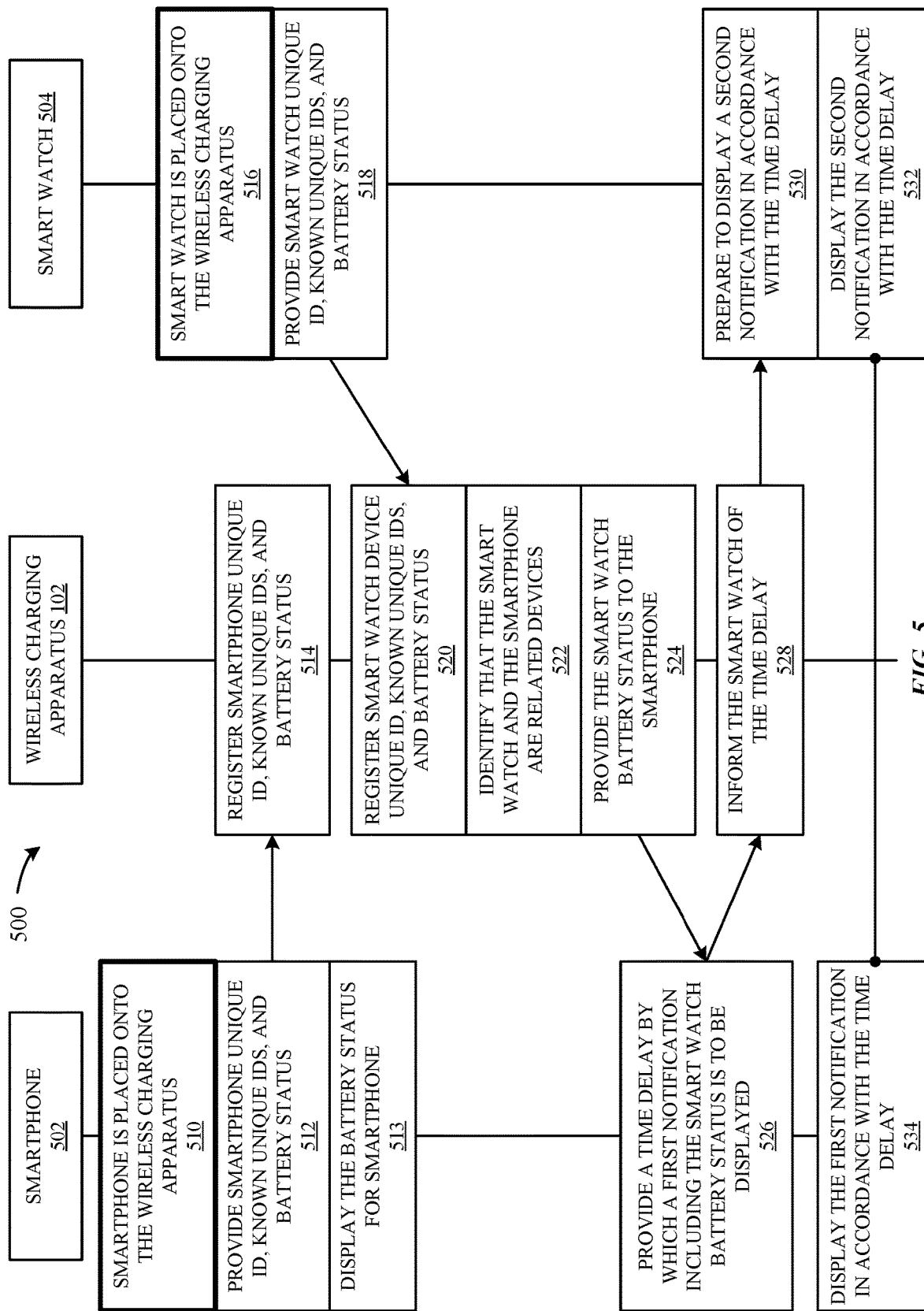
FIG. 5 illustrates a method that involves example devices—in particular, a smartphone and a smart watch—displaying complementary notifications in accordance with their placement onto a wireless charging apparatus, according to some embodiments.

FIG. 5 illustrates a method 500 that involves a smartphone 502 and a smart watch 504 displaying complementary notifications in accordance with their placement onto the wireless charging apparatus 102, according to some embodiments. As shown in FIG. 5, the method 500 begins at step 510, where the smartphone 502 is placed onto the wireless charging apparatus 102. At step 512, the smartphone 502 provides, to the wireless charging apparatus 102, a unique ID 122, known unique IDs 124, and a battery status (i.e., miscellaneous information 126) for the smartphone 502. At step 513, the smartphone 502 itself can display the battery status of the smartphone 502. In turn, at step 514, the wireless charging apparatus 102 registers—e.g., within the device information 110—the unique ID 122, the known unique IDs 124, and the battery status provided by the smartphone 502.

At step 516, a smart watch 504 is placed onto the wireless charging apparatus 102. At step 518, the smart watch 504 provides, to the wireless charging apparatus 102, a unique ID 122, known unique IDs 124, and a battery status for the smart watch 504. Again, and as previously described above, it is noted that it can be optional for the smart watch 504 to provide the known unique IDs 124, as it is likely that the wireless charging apparatus 102 will be able to match the unique ID 122 of the smart watch 504 with the known unique IDs 124 provided by the smartphone 502. In any case, at step 520, the wireless charging apparatus 102 registers the unique ID 122, the known unique IDs 124, and the battery status of the smart watch 504. At step 522, the wireless charging apparatus 102 identifies that the smart watch 504 and the smartphone 502 are related devices.

In response to the identification that occurs at step 522, at step 524, the wireless charging apparatus 102 provides the battery status of the smart watch 504 to the smartphone 502. In turn, at step 526, the smartphone 502 provides, to the wireless charging apparatus 102, a time delay by which a first notification including the battery status of the smart watch 504 is to be displayed by the first computing device 120. At step 528, the wireless charging apparatus 102 informs (e.g., via packets 128) the smart watch 504 of the time delay. Accordingly, at step 530, the smart watch 504 prepares to display a second notification (e.g., including complementary information to the first notification) in accordance with the time delay. Finally, at steps 532 and 534, the smartphone 502 and the smart watch 504 display the first notification and the second notification, respectively, in accordance with the time delay.

Additionally, it is noted that the orders/manners in which the foregoing interactions between the wireless charging apparatus 102 and the various computing devices 120 can be modified without departing from the scope of this disclosure. For example, the computing devices 120 can be configured submit fewer parameters to the wireless charging apparatus 102 when being placed upon/establishing a communication channel with the wireless charging apparatus 102. This can be implemented, for example, to establish a more reactive environment in which the wireless charging apparatus 102 queries present computing devices 120 (if any) about whether they are familiar with a new computing device 120 that is being placed onto the wireless charging apparatus 102 (e.g., as opposed to the computing devices 120 notifying the wireless charging apparatus 102 about known computing devices 120 when being placed onto the wireless charging apparatus 102). In this manner, flexible operating environments can be implemented in which the wireless charging apparatus 102/computing devices 120 can be configured to effectively identify appropriate times at which to coordinate notifications between computing devices 120 that are known to one another. Moreover, it is noted that the informational components that are communicated between the wireless charging apparatus 102 and the computing devices 120 can be transmitted using fewer (or more) messages in comparison to the various examples described herein without departing from the scope of this disclosure.

Additionally, it is noted that the embodiments set forth herein do not require computing devices 120 to be known to one another in order to participate in the coordinated notification schemes described herein. For example, it might be beneficial for a user to place their wearable computing device 120—e.g., one that does not have a built-in display device—onto the wireless charging apparatus 102, upon which an unrelated (e.g., a friend or family member's) computing device 120—e.g., one having a built-in display—and that is placed on the wireless charging apparatus 102—assists in displaying relevant information (e.g., a battery status) associated with the wearable computing device 120. In this regard, the computing devices 120 can be configured (e.g., via a settings menu) to participate or ignore coordinated notification events when unknown computing devices 120 are placed onto the wireless charging apparatus 102. It is additionally noted that the embodiments set forth herein can be adapted to include computing devices 120 that are not necessarily placed on the wireless charging apparatus 102 as participants in the coordinated notification schemes described herein. For example, the wireless charging apparatus 102 can be configured to notify nearby computing devices 120 (e.g., via a direct connection, the Internet, etc.) when other computing devices 120 are placed onto/removed from the wireless charging apparatus 102. This can be beneficial, for example, when a user places their wearable computing device 120 onto the wireless charging apparatus 102, but is holding their smartphone computing device 120 away from (e.g., above or near) the wireless charging apparatus 102. In this regard, the wireless charging apparatus 102 can provide information to the smartphone computing device 120 about the wearable computing device 120, whereupon the smartphone computing device 120 can display the information in a coordinated manner.

Figure 6:
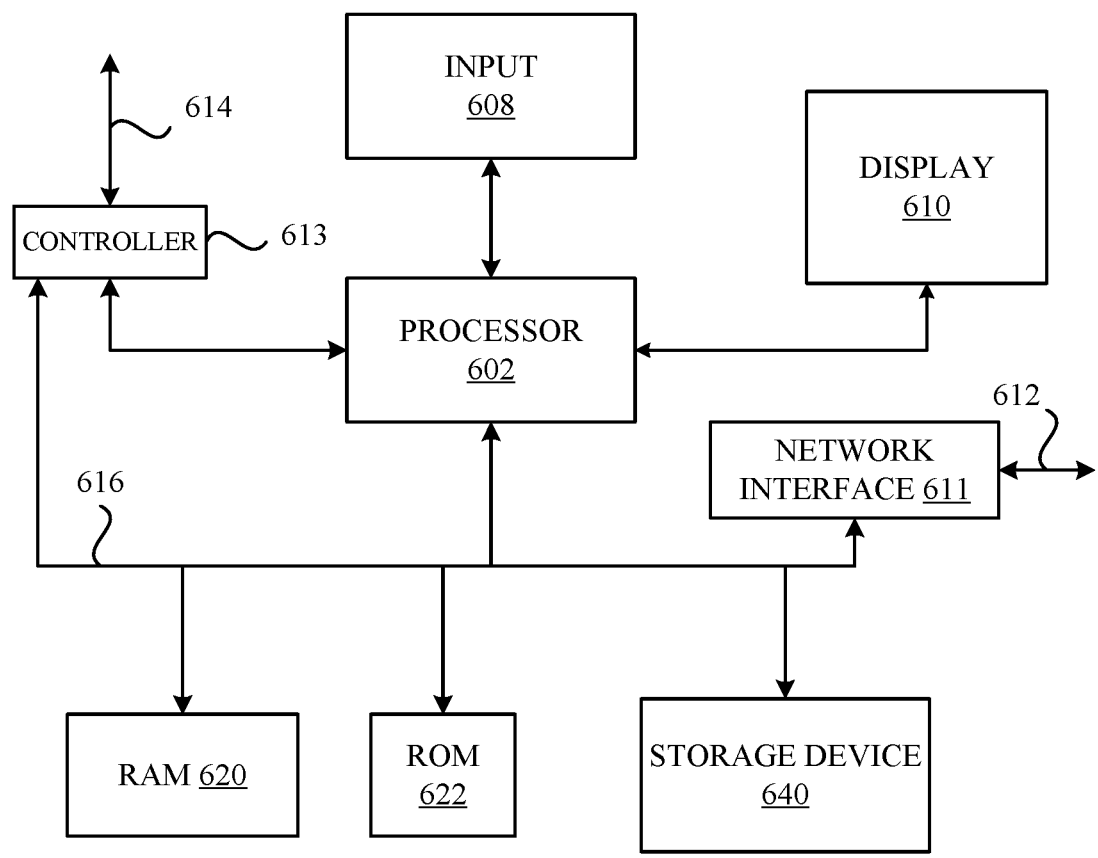
FIG. 6 illustrates a detailed view of a computing device that can represent the computing devices of FIG. 1 used to implement the various techniques described herein, according to some embodiments.

FIG. 6 illustrates a detailed view of a computing device 600 that can represent the computing devices of FIG. 1 used to implement the various techniques described herein, according to some embodiments. For example, the detailed view illustrates various components that can be included in the computing device 102/wireless charging apparatus 102 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for coordinating notifications displayed across computing devices placed onto a wireless charging apparatus, the method comprising, at the wireless charging apparatus:
   detecting a first condition in which a first computing device is placed onto the wireless charging apparatus;
   detecting a second condition in which a second computing device is placed onto the wireless charging apparatus while the first computing device remains placed on the wireless charging apparatus; and
   in response to determining that the second computing device is associated with the first computing device:
      causing both the first and second computing devices to display respective notifications in a coordinated manner based on a time delay, provided by the first computing device.

2. The method of claim 1, further comprising:
   in conjunction with the first computing device being placed onto the wireless charging apparatus:
      receiving first information that includes (1) a first unique identifier (ID) associated with the first computing device, and (2) one or more unique IDs that are each associated with a respective auxiliary computing device associated with the first computing device; and
   in conjunction with the second computing device being placed onto the wireless charging apparatus:
      receiving second information that at least includes a second unique U) associated with the second computing device;
   wherein determining that the second computing device is associated with the first computing device comprises:
      identifying that the second unique ID is included in the one or more unique IDs.

3. The method of claim 2, further comprising, prior to receiving the second information:
   Causing the first, computing device to at least display an indication of a battery status of the first computing device.

4. The method of claim 2, wherein:
   the first information further includes (3) a first device type of the first computing device, and (4) a first battery status of the first computing device; and
   the second information further includes (3) a second device type of the second computing device, (4) a second battery status of the second computing device, and (5) one or more unique IDs that are each associated with a respective auxiliary device associated with the second computing device.

5. The method of claim 4, wherein causing both the first and second computing devices to display the respective notifications in the coordinated manner comprises:

causing the first computing device to display at least a first indication of the second battery status of the second computing device in accordance with the time delay; and
causing the second computing device to produce at least an audible notification in accordance with the time delay.

6. The method of claim 5, wherein the first computing device suppresses the first indication of the second battery status of the second computing device when the first computing device is being utilized by a user.

7. The method of claim 6, wherein the second computing device displays a second indication of the second battery status when the first computing device suppresses the first indication of the second battery status.

8. The method of claim 1, wherein the first and second computing devices are paired computing devices.

9. A method for enabling a first computing device to participate in a coordinated notification, the method comprising, at the first computing device:
   establishing a communication channel with a wireless charging apparatus in conjunction with being placed on the wireless charging apparatus;
   receiving, from the wireless charging apparatus, a notification that a second computing device is placed onto the wireless charging apparatus and is communicatively coupled to the wireless charging apparatus, Wherein the second computing device is associated with the first computing device:
   indicating, to the wireless charging apparatus, a time delay by which a second notification is to be displayed by the second computing device; and
   displaying a first notification in accordance with the time delay.

10. The method of claim 9, wherein establishing the communication channel with the wireless charging apparatus comprises:
    providing, to the wireless charging apparatus, (1) a first unique identifier (ID) associated with the first computing device, and (2) one or more unique IDs that are each associated with a respective auxiliary computing device associated with the first computing device.

11. The method of claim 10, wherein the second computing device is associated with a second unique ID included in the one or more unique IDs associated with the first computing device.

12. The method of claim 10, wherein the auxiliary computing devices represent computing devices that are listed as actively paired or previously paired devices to the first computing device.

13. The method of claim 9, wherein the steps further include, prior to receiving the notification that the second computing device is communicatively coupled to the wireless charging apparatus:
    displaying, at the first computing device, a first indication of a first battery status of the first computing device.

14. The method of claim 9, wherein the second computing device produces at least an audible notification in accordance with the time delay.

15. A wireless charging apparatus configured to coordinate notifications displayed across computing devices placed onto the wireless charging apparatus, the wireless charging apparatus comprising:
    at least one processor;

and at least one memory storing instructions that, when executed by the at least one processor, cause the wireless charging apparatus to perform steps that include:
- detecting a first condition in which a first computing device is placed onto the wireless charging apparatus;
- detecting a second condition in which a second computing device is placed onto the wireless charging apparatus while the first computing device, remains placed on the wireless charging apparatus; and
- in response to determining that the second computing device is associated with the first computing device:
  - causing both the first and second computing devices to display respective notifications in a coordinated manner based on a time delay provided by the first computing device.

16. The wireless charging apparatus of claim 15, wherein the at least one processor further causes the wireless charging apparatus to perform steps that include:
- in conjunction with the first computing device being placed onto the wireless charging apparatus:
  - receiving first information that includes (1) a first unique identifier (ID) associated with the first computing device, and (2) one or more unique IDs that are each associated with a respective auxiliary computing device associated with the first computing device; and
- in conjunction with the second computing device being placed onto the wireless charging apparatus:
  - receiving second information that at least includes a second unique ID associated with the second computing device;
- wherein determining that the second computing device is associated with the first computing device comprises:
  - identifying that the second unique ID is included in the one or more unique IDs.

17. The wireless charging apparatus of claim 16, wherein the at least one processor further causes the wireless charging apparatus to perform steps that include, prior to receiving the second information:
- causing the first computing device to at least display an indication of a battery status of the first computing device.

18. The wireless charging apparatus of claim 16, wherein:
- the first information further includes (3) a first device type of the first computing device, and (4) a first battery status of the first computing device; and
- the second information further includes (3) a second device type of the second computing device, (4) a second battery status of the second computing device, and (5) one or more unique IDs that are each associated with a respective auxiliary device associated with the second computing device.

19. The wireless charging apparatus of claim 18, wherein causing both the first and second computing devices to display the respective notifications in the coordinated manner comprises:
- causing the first computing device to display at least a first indication of the second battery status of the second computing device in accordance with the time delay; and
- causing the second computing device to produce at least audibly notification in accordance with the time delay.

20. The wireless charging apparatus of claim 19, wherein the first computing device suppresses the first indication of the second battery status of the second computing device when the first computing device is being utilized by a user.

* * * * *

UNITED STATES PATENT AND TRADEMARK OFFICE
CERTIFICATE OF CORRECTION

| | | |
|---|---|---|
| PATENT NO. | : 10,778,023 B2 | Page 1 of 1 |
| APPLICATION NO. | : 16/353941 | |
| DATED | : September 15, 2020 | |
| INVENTOR(S) | : Garbus et al. | |

It is certified that error appears in the above-identified patent and that said Letters Patent is hereby corrected as shown below:

In the Claims

In Claim 2, at Column 17, Line 44: "second unique U) associated" should read -- second unique ID associated --.

In Claim 3, at Column 17, Line 52: "Causing" should be -- causing --.

In Claim 9, at Column 18, Line 29: "Wherein" should be -- wherein --.

In Claim 19, at Column 20, Lines 28-29: "at least audibly notification" should read -- at least an audible notification --.

Signed and Sealed this
Seventeenth Day of November, 2020

Andrei Iancu
*Director of the United States Patent and Trademark Office*